United States Patent [19]

Granger

[11] 4,104,683
[45] Aug. 1, 1978

[54] VIDEO RECORDING APPARATUS

[75] Inventor: Edward Maurice Granger, Rochester, N.Y.

[73] Assignee: Eastman Kodak Company, Rochester, N.Y.

[21] Appl. No.: 669,925

[22] Filed: Mar. 24, 1976

[51] Int. Cl.² .................. H04N 5/79; H04N 5/795
[52] U.S. Cl. .......................... 360/9; 360/24; 360/27; 360/32; 360/33; 360/36; 360/37
[58] Field of Search ....................... 360/8–9, 360/24, 27, 32–33, 36–37; 358/4, 127, 12, 133, 138, 141, 142, 145–147; 179/15.55 T

[56] References Cited

U.S. PATENT DOCUMENTS

| | | | |
|---|---|---|---|
| 3,335,218 | 8/1967 | Johnson | 360/37 |
| 3,392,233 | 7/1968 | Houghton | 360/24 |
| 3,504,352 | 3/1970 | Stromswold et al. | 179/15.55 T |
| 3,506,780 | 4/1970 | Camras | 360/19 |
| 3,723,637 | 3/1973 | Fujio et al. | 358/145 |
| 3,723,643 | 3/1973 | Suzuki et al. | 360/24 |
| 3,781,463 | 12/1973 | van den Bussche | 179/15.55 T |
| 3,821,797 | 6/1974 | Suzuki et al. | 360/27 |

FOREIGN PATENT DOCUMENTS

| | | | |
|---|---|---|---|
| 1,263,071 | 3/1968 | Fed. Rep. of Germany | 360/24 |
| 1,219,680 | 1/1971 | United Kingdom | 358/145 |

*Primary Examiner*—Raymond P. Cardillo, Jr.
*Attorney, Agent, or Firm*—Robert F. Cody

[57] ABSTRACT

Apparatus for directly recording television signals on a magnetic medium strips out sync and blanking information. Low frequency components of the television signals are time-compressed, i.e., frequency shifted, and recorded as a substitute for the stripped-out sync and blanking information. Thus, high frequency components of each video line are recorded, followed by that line's low frequency components, thereby facilitating the playback of low frequency information. In a preferred form, the low frequency video information is time-compressed sufficiently to provide time, during the time slot which corresponds to sync and blanking information, for the recording of reference signal information. During playback, the reference signal information is employed to set the gain of the playback circuit.

3 Claims, 3 Drawing Figures

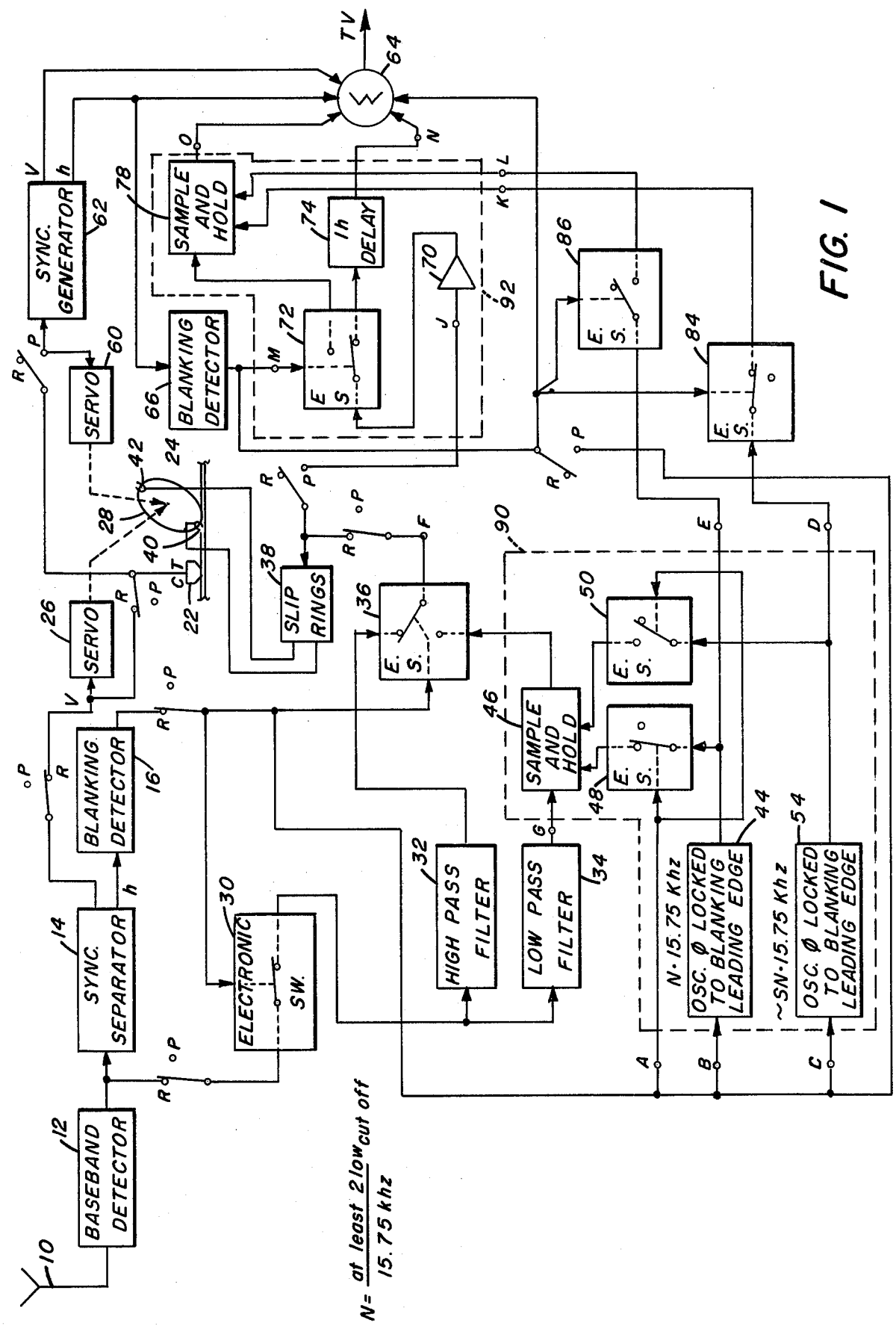

VIDEO RECORDING APPARATUS

CROSS-REFERENCE TO RELATED APPLICATIONS

The following applications are related to each other: copending U.S. Applications Ser. No. 669,923 and Ser. No. 669,924, filed Mar. 24, 1976.

BACKGROUND OF THE INVENTION

Field of the Invention

This invention relates to video recorders, especially those which employ magnetic tape as the recording medium, and which, on playback, feed video signals, say, to the input terminals of a television set. The term "recorder" as used herein shall be interpreted to include playback apparatus as well.

2. Description Relative to the Prior Art

As is known, the video spectrum, as typified by the NTSC baseband signal, contains frequency components from DC to 3 MHz or more, the lower frequencies corresponding at least in part to scene background information, and the higher frequencies corresponding to scene detail information. Because the playback of information recorded on a magnetic medium such as magnetic tape is frequency-dependent (i.e., system response to the playback signal is dependent on the rate of change of flux as seen by a playback head), flux patterns which correspond to low frequency signal components are not easy to detect in the magnetic tape. Prior attempts to record and play back, say, the baseband NTSC signal have, therefore, usually involved the baseband-modulation, during recording, of a relatively high frequency carrier. By so using a baseband-modulated carrier, the playback circuits of the recorder can be tuned to respond to the rapidly changing flux characteristics which correspond to the recorded carrier, with the baseband video signal being then relatively easy to detect and remove from the modulated carrier. While the practice of recording a modulated carrier solves the problem associated with the playback of low frequency information, it does so not without cost: First, because a high frequency carrier must be recovered during playback, the gap in the playback head — for a given speed of tape past the playback head — must be narrower than for the case of a directly recorded baseband signal, a factor which usually means higher head cost. And, second, because the baseband signal, when it modulates the carrier during the recording operation, produces signal sidebands — which must be recorded, and recovered during playback — the spectrum of frequencies to be processed by the recorder (i.e., the recorder bandpass requirements) will be wider than in the case of a baseband recorder. Such bandwidth requirements directly affect information packing density; and, thus, for maximum tape economy for a given amount of video information, the prior practice of recording a modulated carrier leaves much to be desired.

As indicated above, playback of magnetically recorded information depends on the rate of change of flux as seen by a magnetic head. This may suggest that — rather than place the baseband video signal on a carrier as a vehicle for playing back low frequency video — the track containing the recorded video information be widened a bit for cooperation with a widened magnetic playback head, the recorded information being the full video baseband signal. In that way, flux-to-head linkage will increase and, attendant, so will the playback signal-to-noise ratio (SNR) — which should improve the recoverability of low frequency information. But widening the record track works counter to the goal of "high-packing-density tape usage". Besides, low frequencies, when recorded on a magnetic medium, create flux patterns within the medium which tend to spread out and, to assure that the low frequencies recorded in one track are not played back during the playback of an adjacent track, sizable guard bands between the tracks have to be used, again adversely influencing the efficient use of the magnetic medium.

Aside from the above techniques for recovery of low frequency information from a magnetic recording medium, one might also consider separating the low frequency components of the baseband signal from the higher frequency components, and then recording the low frequencies on a carrier in a separate track. But the use of two tracks to record the baseband information, obviously, is not in the interest of tape efficiency.

SUMMARY OF THE INVENTION

To attain narrow track baseband recording of video information such as that contained in the NTSC signal format, the invention proposes (1) separating the baseband signal prior to recording into high and low frequency bands, (2) time compressing the low frequency band, and (3) recording, say, the high frequency band for each video line of information, and then, in the same track in which the high frequency components are recorded, recording the time-compressed low frequency band of that line as a substitute for the recording of sync and blanking information. Then, during playback, the time-compressed low frequency band is time-stretched to its proper form and, by use of a suitable delay device through which the high frequency is processed, the high and low frequency bands are brought into proper phase with each other, a locally-generated sync and blanking signal being substituted for the recovered time-compressed low frequency band. In this way, not only are signal-modulation and/or track widening techniques for the recovery of low frequency signal information obviated, but also the signals to be recorded are compressed, bandwidth-wise, by an amount equal to the bandwidth of the low frequency band. That is, for a signal baseband of from DC to 3 MHz, assuming a low frequency bandwidth of from DC to 40 KHz, the actual range of information frequency to be recorded is not DC to 3 MHz, but rather only from 40 KHz to 3 MHz.

In a preferred embodiment of the invention, the time compression of low frequency information is obtained by sampling the low frequency information at a first sample rate and then, during recording, the samples are recorded at a higher sample rate. During playback, the samples are processed first at the higher rate and then, to effect time stretching, at the lower rate. Since direct recording is a "signal amplitude recording process", the invention further proposes that not only low frequency signal information be substituted for sync and blanking information, but that amplitude reference information form part of the substitute information, such reference information to be employed for system automatic gain control (AGC). And, if the amplitude reference information takes the form of a series of pulses, say at a frequency that correlates with the standard color subcarrier, the phase information contained in the pulses can be employed for color burst regeneration, sync pulse regeneration, and other system timing.

The invention will be described with reference to the figures, of which:

FIG. 1 is a block diagram of apparatus according to the invention; and

Figure 2A:
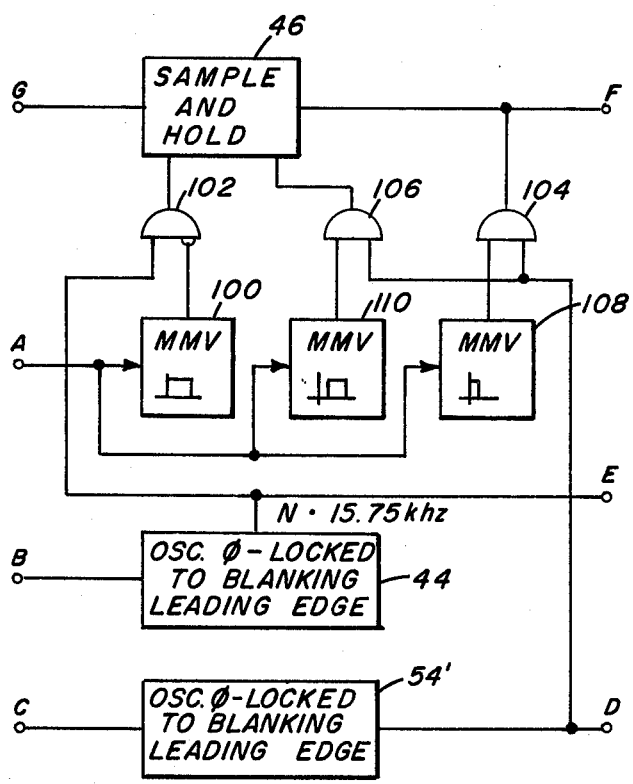
FIGS. 2A and 2B are block diagrams which, when substituted for circuits within the system of FIG. 1, provide another embodiment of the invention.

Referring to FIG. 1, a video recorder which is adapted to receive a television signal off an antenna 10 detects the information or baseband signal by means of a detector 12. A circuit 14, for removing the sync information contained in the output of the baseband detector 12, applies its horizontal sync output $h$ to a circuit 16 adapted to produce a signal corresponding to the duration of the blanking signal on which the sync signal rides. The blanking detector 16, typically, will include a counter, a particular count of which is kept in sync with an edge of the sync pulse, and which counter is reset when its count reaches a count corresponding to the duration of the blanking period. The vertical sync pulse output $v$ from the sync separator 14 is applied via a RECORD-PLAYBACK switch to a magnetic head 22 for laying down a control track on magnetic tape 24. In addition, the vertical sync pulse is applied to a servo 26 which slaves the speed of a head wheel 28 to the vertical sync pulse rate.

The video information contained in the output of the baseband detector 12 is applied via an electronic switch 30 to high and low pass filters 32, 34, respectively, the switch 30 being actuated (opened), at the horizontal sync rate, by the output of the blanking detector 16. In accordance with the invention, the high frequency content of the baseband signal is applied via an electronic switch 36, and slip rings 38, to magnetic heads 40, 42 which cooperate with and scan the tape 24 in a well-known manner.

At the same time that the high frequency content of the baseband signal is recorded, the low frequency content of the baseband signal is processed for recording as a replacement for the sync and blanking information eliminated by actuation of the switch 30. Briefly, the low frequency output of the filter 34 is sampled at a first rate and then, during a period that corresponds with the horizontal blanking portion of the baseband signal, the low frequency samples are clocked at a relatively high rate onto the tape 24. Assuming the low frequency band extends from DC to 40 KHz, in order to meet the Nyquist criterion and thus avoid aliasing effects, the sampling of low frequency information must be such that the number of samples N taken across a horizontal line of low frequency video information times the horizontal line rate equals at least twice the upper frequency edge (i.e., two times 40 KHz equals 80 KHz), of the low frequency band. And, in this regard, seven samples of low frequency information have been found adequate, an oscillator 44 being operated at seven times the line rate of 15.75 KHz to effect such sampling by a sample-and-hold circuit 46. The sampling oscillator 44 applies its sampling signals to the sample-and-hold circuit 46 via an electronic switch 48 during the occurrence of each line of low frequency information and, at the occurrence of the blanking signal, the electronic switch 48, as well as an electronic switch 50, actuate respectively to stop the sampling operation and to feed, by use of an oscillator 54 — and via the switch 36 which is also actuated by the blanking signal — the "held" low frequency samples to the tape 24. Since the blanking signal has a duration which is about one-fifth the duration of a horizontal scan line, the oscillator 54 has a frequency at least about five times that of the oscillator 44. In other words, while low frequency samples are slowly taken over the course of a horizontal line, they are quickly clocked onto the tape during the relatively brief blanking period, and thus appear as easily recoverable high frequency information, at least as far as head-to-tape interaction is concerned.

During playback, reverse signal processing is employed: A servo 60 (which obviously may be the servo 26 operated through suitable switching) drives the head wheel 28 under control of the control track head 22; and vertical and horizontal sync pulses are produced by a sync pulse generator 62 responsive to the control track information (head 22), the sync pulses being applied to a summing circuit 64 adapted to reconstruct the baseband signal. A blanking detector 66 like the detector 16 (or, with suitable switching, the same one) produces switching signals for use in gating the playback information to either of two processing channels. The playback information — comprising, in sequence, a band of high frequency signals occurring over a 1-$h$ duration, followed by a band of low frequency signals occurring over a "blanking" duration, followed by a band of high frequency signals occurring over a 1-$h$ duration, followed by a band of low frequency information occurring over a "blanking" duration, etc. — is applied via slip rings 38, and playback amplifier 70, to an electronic switch 72. The switch 72 is actuated by the playback blanking signal (circuit 66) and steers the playback information as follows: The high frequency information is applied to a 1-$h$ delay 74 which lets the low frequency signal information — corresponding to such high frequency information, and recorded timewise on the tape after the high frequency information — to catch up in time with the high frequency information; and the low frequency information, which was time-compressed for recording during the blanking period, is applied to a sample-and-hold circuit 78 (or sample-and-hold circuit 46 via suitable switching) and stretched timewise to allow it to assume a proper phase with respect to its corresponding high frequency information. To this end, the oscillator 54 rapidly clocks (electronic switch 84) the low frequency samples into the sample-and-hold circuit 78 during the blanking portion and, as the high frequency information progressively appears at the output of the 1-$h$ delay 74, the oscillator 44 clocks (electronic switch 86) the low frequency information out of the sample-and-hold circuit 78 in proper phase with the high frequency signal information with which it correlates. With the high and low frequency information, and the sync and blanking information, all appearing at the summing circuit 64 in proper time, the circuit 64 produces a baseband signal which may, for example, be modulated on a carrier and played through a television receiver.

Not only to stabilize system timing, but also to avoid introducing unwanted modulation of the processed low frequency information, the oscillators 44, 54 are phase-locked to sync information, either the sync information derived from the antenna 10, or the sync information derived off the tape 24.

To be realized is that by means of the present invention the recording of low frequency information as such can be avoided by the time compression of such low frequency information and the use of that time compressed information as a substitute for sync and blanking information. While the compression has been indicated as being by use of sample-and-hold techniques, other time compression practices can be used in practicing the invention. For example, rather than sample and hold, a temporary recording, say of a line of low frequency information, could be made, followed by a suitably timed fast playing thereof onto tape during the record blanking period. During playback, the reverse would be done.

Figure 2B:
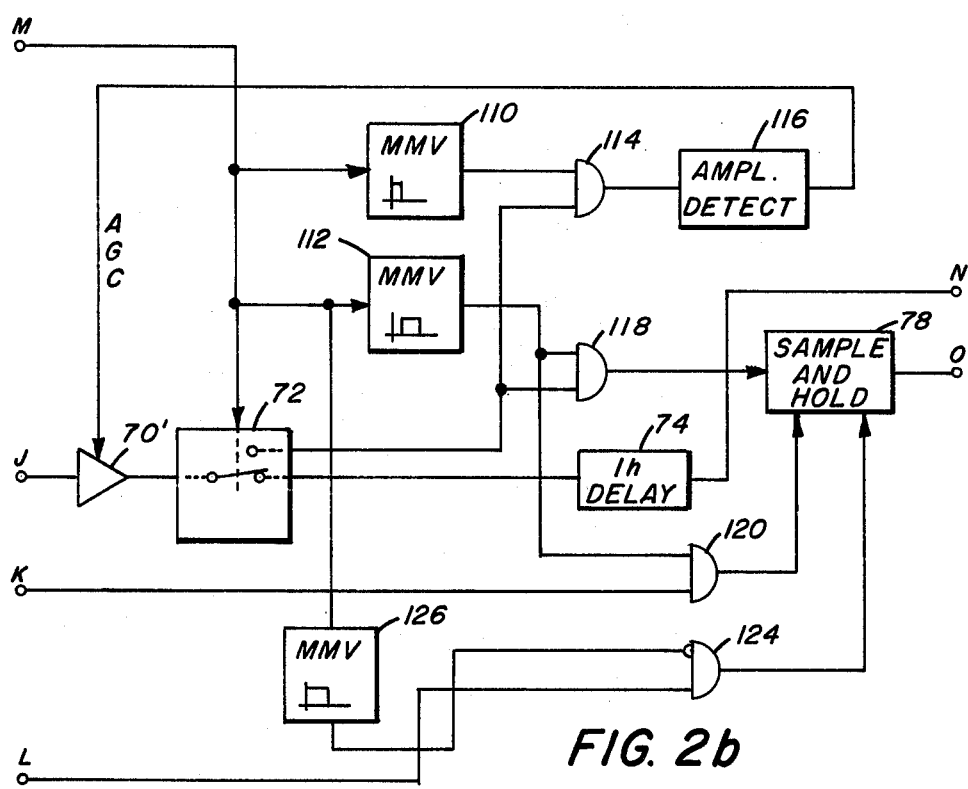

As indicated above, the invention in its presently preferred form proposes the reservation of part of the blanking period for reference information. To this end, the "record" circuit 90, and the "playback" circuit 92 of FIG. 1 may be replaced, respectively, by the circuits of FIGS. 2A and 2B: During each horizontal line of video information, the oscillator 40, via a gate 102, samples and holds (circuit 46) the low frequency information appearing at point G. At the occurrence, and for the duration, of a blanking signal (point A), the sample-and-hold operation is stopped by operation of a monostable multivibrator 100 which inhibits the gate 102. While sampling signals are inhibited from the sample-and-hold circuit 46, two gates 104 and 106 are opened in tandem for the combined duration of the blanking signal appearing at point A, the gate 104 being opened by actuation of a monostable multivibrator 108, and the gate 106 being opened by actuation of a monostable multivibrator 110.

While the gate 104 is opened, a series of pulses, X in number, are recorded on the tape 24, the amplitude of such pulses being uniform and useful for system gain control, as will appear below. Also, since the series of X pulses of reference amplitude carry certain phase information, they are useful for color burst regeneration and other timing purposes. After the reference pulses are gated to the tape, the gate 104 closes, and the gate 106 opens. With the gate 106 open, the high frequency oscillator 54' applies its output to unload the held samples onto the tape 24. Thus, low frequency samples are taken over the duration of a line and, during the blanking period following that line, both pulses having a reference amplitude, and the low frequency samples, are recorded as substitute information.

During playback, the amplifier 70' output is toggled between the two channels under control of the blanking signal appearing at point M. Recorded high frequency information is 1-h delayed (74) as above and appears at point N. On occurrence of a blanking signal, however, the monostable multivibrators 110, 112 are actuated, the monostable multivibrator 110 opening a gate 114 to apply the X reference pulses to an amplitude detector 116 which, via feedback, sets the gain of the amplifier 70', such gain being updated prior to the playback of each line of video information. As soon as the monostable multivibrator 110 closes the gate 114, the monostable multivibrator 112 opens the gates 118 and 120, thereby to sample (and hold) quickly the playedback low frequency information. Then, i.e., after the high frequency playback sampling stops, and with the low frequency samples held within the circuit 78, an inhibit gate 124, held closed by a monostable multivibrator 126 responsive to the blanking signal, opens to clock the low frequency samples out of the sample-and-hold circuit 78 in proper time with the high frequency information appearing at the output of the delay 74.

The invention has been described in detail with particular reference to preferred embodiments thereof, but it will be understood that variations and modifications can be effected within the spirit and scope of the invention.

What is claimed is:

1. Signal processing apparatus comprising:
   a. means for producing NTSC-type television signals;
   b. means for stripping sync and blanking information from said NTSC-type television signals, thereby to produce a series of video signals separated in time from each other;
   c. means for splitting the video signals into respective high and low frequency component bands;
   d. means for time compressing the signals which comprise the low frequency component band of the video signals so that such signals respectively occur during periods corresponding to the duration of sync and blanking;
   e. means for delaying the signals which comprise the time compressed low frequency band to occur respectively during the time separation between successive video signals; and
   f. means for combining the signals which comprise the delayed time compressed low frequency band with the signals which comprise the high frequency band, thereby to produce a train of signals having high frequency components periodically interspersed with low frequency components, and
     a. said means for time compressing the signals which comprise the low frequency component band being adapted to time compress such signals to occur during a period less than the duration of sync and blanking; and
     b. wherein said apparatus includes means for adding reference signal information to occur during that part of the time separation between successive video signals which is unoccupied by time compressed signals.

2. Signal processing apparatus comprising:
   a. means for producing NTSC-type television signals;
   b. means for stripping sync and blanking information from said NTSC-type television signals, thereby to produce a series of video signals separated in time from each other;
   c. means for splitting the video signals into respective high and low frequency component bands;
   d. means for time compressing the signals which comprise the low frequency component band of the video signals so that such signals respectively occur during periods corresponding to the duration of sync and blanking;
   e. means for delaying the signals which comprise the time compressed low frequency band to occur respectively during the time separation between successive video signals;
   f. means for combining the signals which comprise the delayed time compressed low frequency band with the signals which comprise the high frequency band, thereby to produce a train of signals having high frequency components periodically interspersed with low frequency components;
   g. means for recording said train of signals on a magnetic medium;
   h. means for use in playing said train of signals from said magnetic medium;
   i. means for separating the signals which comprise the compressed low frequency component band from the signals which comprise the high frequency component band;

j. means for delaying each of the signals which comprise the high frequency component band by about the duration of one video line;
k. means for time stretching each of the signals which comprise the low frequency component band to occur over the duration of one video line;
l. means for combining signals corresponding to the high frequency component band with respective time stretched signals corresponding to the low frequency component band, thereby to reform a series of broadband video signals separated in time from each other; and
m. means for reinserting sync and blanking signals within the time separations between successive video signals, and
   a. said means for time compressing the signals which comprise the low frequency component band being adapted to time compress such signals to occur during a period less than the duration of sync and blanking;
   b. wherein said apparatus includes means for adding reference signal information to occur during that part of the time separation between successive video signals which is unoccupied by time compressed signals;
   c. wherein said means for playing said train of signals from said magnetic medium includes an amplifier; and
   d. wherein said apparatus includes means responsive to said reference signal information for varying the gain of said amplifier.

3. Apparatus for recording television signals on a magnetic medium comprising:
   a. means for splitting said signals into respective bands of high and low frequency components;
   b. means for time compressing each signal's low frequency components into a duration no greater than the duration of the television blanking signal;
   c. means for processing said signals forming said band of high frequency components and said time compressed low frequency signal components to produce a train of signals in which high frequency components successively alternate with corresponding time compressed low frequency signal components; and
   d. means adapted to receive and record said train of signals on said magnetic medium, and
      a. means for playing back said train of signals from said magnetic medium;
      b. means for time stretching said low frequency signal components to occur over the duration of a video line;
      c. means for recording said signals corresponding to high frequency components and said time stretched low frequency signal components to form a train of broadband video signals, each of which is spaced in time by a predetermined amount from its next occurring signal; and
      d. means for adding sync and blanking signals between each pair of broadband video signals, and wherein
         a. said means for playing back signals includes an amplifier;
         b. said means for time compressing each signal's low frequency components compresses such components into respective periods less than the duration of said television blanking signal, thereby to provide a series of time periods useful for reference signal information;
         c. said means for processing signals includes means for inserting reference signal information into the time periods for reference signal information; and
         d. said apparatus includes means responsive to said reference signal information for varying the gain of said amplifier.

* * * * *